United States Patent
Sutehall et al.

(10) Patent No.: US 10,209,468 B2
(45) Date of Patent: Feb. 19, 2019

(54) HIGH INSTALLATION PERFORMANCE BLOWN OPTICAL FIBRE UNIT, MANUFACTURING METHOD AND APPARATUS

(71) Applicant: PRYSMIAN S.P.A., Milan (IT)

(72) Inventors: Ralph Sutehall, Milan (IT); Martin Davies, Milan (IT); Nathan Paddick, Milan (IT); Paul Roberts, Milan (IT); Ian Dewi Lang, Milan (IT); Mark Richard Mason, Milan (IT)

(73) Assignee: PRYSMIAN S.p.A, Milan (IT)

( * ) Notice: Subject to any disclaimer, the term of this patent is extended or adjusted under 35 U.S.C. 154(b) by 0 days.

(21) Appl. No.: 15/037,512

(22) PCT Filed: Nov. 29, 2013

(86) PCT No.: PCT/IT2013/000335
§ 371 (c)(1),
(2) Date: May 18, 2016

(87) PCT Pub. No.: WO2015/079463
PCT Pub. Date: Jun. 4, 2015

(65) Prior Publication Data
US 2016/0274324 A1      Sep. 22, 2016

(51) Int. Cl.
*G02B 6/44* (2006.01)

(52) U.S. Cl.
CPC ......... *G02B 6/4438* (2013.01); *G02B 6/4433* (2013.01); *G02B 6/4486* (2013.01); *G02B 6/4464* (2013.01)

(58) Field of Classification Search
None
See application file for complete search history.

(56) References Cited

U.S. PATENT DOCUMENTS 4,976,519 A * 12/1990 Davey ................... G02B 6/443
   385/102
5,062,685 A * 11/1991 Cain ................... C03C 25/1065
   385/102
(Continued)

FOREIGN PATENT DOCUMENTS

EP      0 296 836      12/1988
EP      0 521 710      1/1993
(Continued)

OTHER PUBLICATIONS

International Search Report from the European Patent Office for Internatioinal Application No. PCT/IT2013/000335, dated Apr. 4, 2014.
(Continued)

*Primary Examiner* — Michelle R Connelly
(74) *Attorney, Agent, or Firm* — Finnegan, Henderson, Farabow, Garrett & Dunner, L.L.P.

(57) ABSTRACT

An optical fiber unit for air-blown installations includes a number of optical conductors, a first layer of resin material, a second layer of resin material radially outer to the first layer of resin material and a sheath of a thermoplastic material, wherein the second layer of resin material has a secant modulus higher than a secant modulus of the first layer of resin material and wherein the sheath of thermoplastic material is over and in close contact with the second layer of resin material.

20 Claims, 5 Drawing Sheets

(56) References Cited

U.S. PATENT DOCUMENTS

| | | | |
|---|---|---|---|
| 6,334,015 B2 | 12/2001 | Jamet | |
| 2002/0147248 A1 * | 10/2002 | Montgomery | C03C 25/106 |
| | | | 522/90 |
| 2004/0022511 A1 * | 2/2004 | Eekelen | C03C 25/1065 |
| | | | 385/128 |
| 2005/0018983 A1 * | 1/2005 | Brown | G02B 6/4438 |
| | | | 385/102 |
| 2008/0279516 A1 | 11/2008 | Chen et al. | |
| 2008/0285925 A1 | 11/2008 | Graveston et al. | |

FOREIGN PATENT DOCUMENTS

| | | | | |
|---|---|---|---|---|
| EP | 1 550 890 | | 7/2005 | |
| EP | 1550890 A1 * | 7/2005 | | G02B 6/441 |
| EP | 2056148 A2 * | 5/2009 | | G02B 6/4401 |
| GB | 2065324 | | 6/1981 | |
| GB | 2 409 908 | | 7/2005 | |
| WO | WO 2004/015475 | | 2/2004 | |

OTHER PUBLICATIONS

First Examination Report in counterpart New Zealand patent application from the New Zealand Intellectual Property Office, dated Nov. 26, 2018 (5 pages).

\* cited by examiner

HIGH INSTALLATION PERFORMANCE BLOWN OPTICAL FIBRE UNIT, MANUFACTURING METHOD AND APPARATUS

CROSS-REFERENCE TO RELATED APPLICATION

This application is a national phase application based on PCT/IT2013/000335, filed Nov. 29, 2013, the content of which is incorporated herein by reference.

BACKGROUND

The present invention relates to optical fibre units for air-blown installations. More in particular, the present invention relates to a blown optical fibre unit providing high installation performance. The present invention also relates to an apparatus and a method of manufacturing such a blown optical fibre unit.

PRIOR ART

Fiber optic cables have been commonly deployed by installing them in ducts by blowing or pulling, burying them in the ground, or suspending them between above-ground poles.

Optical microcabling technology has been introduced for the deployment of fiber optic cables to increase use of the conduit space and to enhance profitability of the current (and/or future) telecommunications infrastructure. This technology involves the use of standard inner ducts in which microducts are jetted, followed by the jetting of microduct cables or microcables into the microducts when required. Although originally intended for business access networks (FTTB) and fiber-to-the-home (FTTH), this technology has been used successfully in long-haul applications as well.

Microducts are empty tubes of small outer/inner diameter (e.g., generally in the range of 5/3.5 millimeters to 12/10 millimeters) that can be blown or pushed into empty or partially filled standard ducts. Optical fiber units, specifically designed for this kind of application, are then installed as needed inside the microduct tubes by blown installation techniques.

In some known blown optical fibre units, a number of coated optical fibres (for example, four, in bundles or ribbon, but also a single optical fibre) are contained within a soft inner layer enclosed in an outer harder layer. In the outer harder layer particulate material (typically hollow or solid glass beads) is embedded.

EP 0 521 710 discloses an optical fibre package suitable for blown installation and a method of making an optical fibre package for blown installation in a continuous process.

WO 2004/015475 A2 discloses a fibre optic cable including a core of primary coated optical fibres embedded in an inner layer of acrylate material, having sufficient tensile strength when cured to lock at least the outermost fibres in place and still allow the fibres to be easily broken out of the assembly for termination and splicing purposes. The hardness of the acrylate layer is such that at least the outermost fibres of the bundle are restricted from moving axially relative to the inner layer. The inner layer (3) is then surrounded by a loose thin jacket formed from a mixture of high density polyethylene having a Shore hardness greater than or equal to 60 and a generally uniformly distributed slip agent, including a polyether modified poly (dimethylsiloxane) material such as polyether modified hydroxy functional poly (dimethylsiloxane) material. According to WO 2004/015475 A2 it has been found to be beneficial for the outer layer not to be bonded to the inner layer and it is preferable that a small gap is present between the two layers.

EP 0 296 836 discloses an optical fibre cable comprising an inner sheath containing at least one optical fibre member, and an outer sheath containing the inner sheath. The inner sheath is of a material which is soft and has a low modulus of elasticity. The outer sheath of a material having bulk properties, such as density and stiffness, and surface properties, such as surface texture and friction such that the cable can be propelled along a duct by a flow of air travelling along the duct. An intermediate sheath may be provided between the inner and outer sheaths.

U.S. Pat. No. 6,334,015 discloses a cable with optical fibers retained in a sheath.

SUMMARY OF THE INVENTION

The Applicant maintains that optical fibre packages where particulate material (typically hollow or solid glass beads) is embedded in the outer harder layer provide generally good blowing performance. However, such arrangements have the shortcoming that, due to the presence of particulate material, the access to the optical fibers is not deemed to be easy. In addition, some customers have pre-conceived ideas and perceptions that such blown optical fiber unit is not classed as a cable.

The Applicant has realized that the fibre optic cable according to WO 2004/015475 A2 does not provide a good installation performance. According to the Applicant, the installation performance of the fibre optic cable according to WO 2004/015475 A2 are negatively affected, inter alia, by the gap between the outer layer and the inner layer.

The Applicant has realized that the optical fibre cable of EP 0 296 836 has an outer sheath of a material having low density. This material provides a high friction which is undesirable for an optical fibre cable designed for air-blown installation. In addition, the Applicant has realized that the optical fibre cable of EP 0 296 836 has a rather large diameter or comprises a rather low fiber density.

The Applicant has realized that the cable of U.S. Pat. No. 6,334,015 is rather flexible and this characteristic results in rather low blowing performance. The outer surface of the cable may be covered with oil or grease and this is inconvenient.

The Applicant has faced the problem of providing a blown optical fiber unit for air-blown installation providing high installation performance while ensuring an easy access to the optical conductors inside the unit.

The Applicant has faced the above problem. According to the Applicant a blown optical fibre unit which provides such features can be obtained with a two layer resin applied over a number of optical conductors. Around this assembly of resin coated optical conductors a layer of thermoplastic polymer is provided. Such outer layer is in close contact with the resin material.

Differently from some prior art arrangements, no particulate material (typically glass beads) is embedded in the outer layer.

Differently from some other prior art arrangements, there is no gap between the resin material and the outer layer. This improves the air-blown installation performance.

According to one aspect, the present invention provides a blown optical fibre unit for air-blown installations comprising a number of optical conductors, a first layer of resin material, a second layer of resin material radially outer to the first layer of resin material and a sheath of a thermoplastic material, wherein the second layer of resin material has a Secant Modulus higher than a Secant Modulus of the first layer of resin material and wherein the sheath of a thermoplastic material is over and in close contact with the second layer of resin material.

In examples of the present invention, the radial thickness of the sheath is between 100 µm and 250 µm, preferably between 100 µm and 200 µm.

In examples of the present invention, the Secant Modulus of first layer is between 0.5 MPa and 25 MPa, preferably between 0.6 MPa and 10 MPa.

In examples of the present invention, the Secant Modulus of second layer is between 500 MPa and 1000 MPa, preferably between 600 MPa and 750 MPa.

In examples of the present invention, the inner layer essentially consists of a matrix material with a elongation at break higher than about 130%.

In examples of the present invention, the sheath is substantially consisting of a high density polyethylene.

In examples of the present invention, the high density polyethylene has a hardness equal to or higher than 59 Shore D.

According to another aspect, the present invention provides a method of manufacturing an optical fiber unit for air-blown installations, the method comprising:
providing a number of optical conductors,
applying a first resin material on the optical conductors and curing the first resin material,
applying a second resin material on the cured first resin material and curing the second resin material, and
forming a sheath of a thermoplastic material around the second cured resin material,
wherein the second layer of resin material has a Secant Modulus higher than a Secant Modulus of the first layer of resin material and wherein the sheath of a thermoplastic material is formed over and in close contact with the second layer of resin material.

In examples of the invention, the sheath forming comprises forming a sheath of a thermoplastic material with a radial thickness between 100 µm and 250 µm, preferably between 100 µm and 200 µm.

In examples of the invention, the sheath forming comprises a process wherein an end of an optical core comprising the optical conductors, the inner layer and the outer layer is arranged inside an extrusion die, wherein said extrusion die has the same size as an outer diameter of the optical unit, wherein polymer material is formed around the cable core at high pressure, so that sheath is formed tightly onto the cable core.

According to still another aspect, the present invention provides an apparatus for manufacturing an optical fiber unit for air-blown installations, the apparatus comprising:
a first resin applicator for applying a first resin material on a number of optical conductors and a first curing device for curing said first resin material,
a second resin applicator for applying a second resin material on said first resin material and a second curing device for curing said second resin material, and
a head for forming a sheath of a thermoplastic material around said second cured resin material,
wherein said second layer of resin material has a Secant Modulus higher than a Secant Modulus of said first layer of resin material and wherein said sheath of a thermoplastic material is formed over and in close contact with said second layer of resin material.

The head may be configured so that an end of an optical core comprising the optical conductors, the inner layer and the outer layer is arranged inside an extrusion die, wherein the extrusion die has the same size as an outer diameter of the optical unit, wherein polymer material is formed around the cable core at high pressure, so that sheath is formed tightly onto said cable core.

The radial thickness of the sheath is between 100 µm and 250 µm, preferably between 100 µm and 200 µm.

BRIEF DESCRIPTION OF DRAWINGS

The present invention will become more clear from the detailed following description, given by way of example and not of limitation, with reference to the following figures, wherein.

DESCRIPTION OF EXAMPLES

Figure 1:
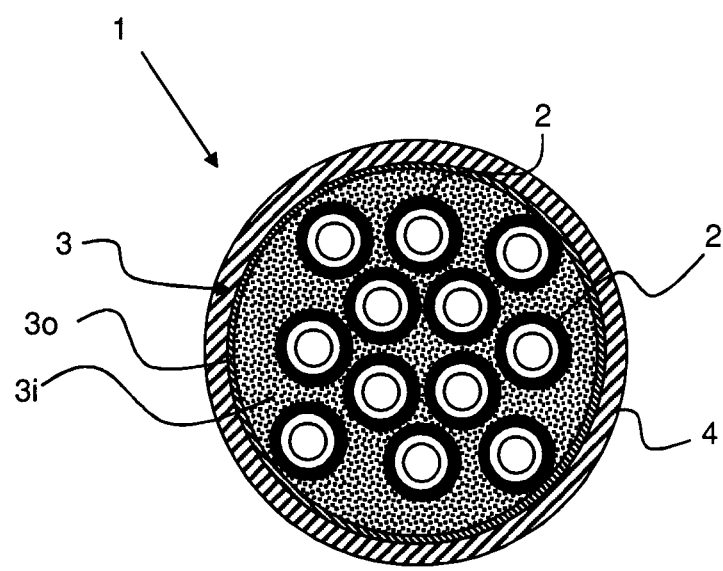
FIG. 1 is a schematic cross-section of a blown optical fibre unit according to a first example of the present invention.

FIG. 1 represents a schematic cross-section of a blown optical fibre unit 1 according to a first example of the present invention.

The optical fiber unit 1 comprises a plurality of optical conductors 2. In the example of FIG. 1 twelve optical conductors 2 are provided. However, in other examples (not shown) the number of optical conductors 2 could be higher or lower than twelve.

Preferably, each of the optical conductor 2 is substantially the same as the other optical conductors. However, within the scope of protection of the present invention are also examples wherein the optical conductors differ in terms of, for instance, outer diameter, material of the outer layer and properties of the optical core.

Each of the optical conductors 2 preferably comprises an optical coated fibre.

The term "optical fibre" is meant to indicate an optical glass core surrounded by a glass cladding and a coating system comprising one or two layers of cured resins, for example acrylate resins. The optical fibers may be single mode or multimode optical fibers with a nominal diameter between about 190 µm and about 250 µm. Relative to each other, the optical fibers may have a length difference of less than about 0.03%. The optical fibers generally extend in a longitudinal direction.

According to the present invention, the optical conductors 2 are encapsulated in a layer 3 of a thermoplastic or thermosetting plastic substance derived from acrylic acid, methacrylic acid or other related compounds. Preferably, such layer 3 comprises an acrylate resin. More preferably, such resin comprises a ultraviolet (UV) curable acrylate resin.

The optical conductors 2 can be arranged in different ways in the layer 3. The arrangement of FIG. 1 is not limiting for the invention.

In the example with twelve optical conductors 2, the resin layer 3 can have an outer diameter of about 1.3 mm so that the optical conductors 2 become completely, or substantially completely, embedded in the resin layer. In arrangements with a higher or lower number of optical conductors, the outer diameter of the resin layer can be changed accordingly.

Preferably, the resin layer 3 comprises at least two layers, an outer layer 3o and an inner layer 3i. The two layers have different Secant Modulus, with the outer layer 3o having a higher Secant Modulus than the inner layer 3i. The low Modulus inner layer 3i prevents that external forces acting on the unit are transferred to the optical conductors, additionally low Modulus inner layer 3i provides for easy installation in the field as it can be easily removed from the optical conductors, without damaging them.

As used herein Modulus, or Secant Modulus is defined as the slope of a line between the 0 point and a point at 2.5% strain in the stress-strain curve of the cured material, tested at 25° C. and 50% Relative Humidity.

Preferably, Modulus of inner layer 3i is between 0.5 MPa and 25 MPa, more preferably between 0.6 MPa and 10 MPa. In one preferred example, Modulus of inner layer 3i is about 1.0 MPa.

Preferably, Modulus of outer layer 3o is between 500 MPa and 1000 MPa, more preferably between 600 MPa and 750 MPa. In one preferred example, Modulus of outer layer 3o is about 668 MPa.

Preferably, inner layer 3i has a diameter between about 50% and about 90% of the outer diameter of resin layer 3. Preferably, the inner layer 3i has a diameter of about 85% of the outer diameter of resin layer 3.

Preferably, inner layer 3i essentially surrounds each optical conductor so that there is at least some material with a thickness of about 1 μm to about 10 μm between two adjacent optical conductors over the majority of the length.

Preferably, the resin of inner layer 3i comprises a matrix material with a high elongation at break, preferably higher than about 130%. Preferably, the resin of outer layer 3o comprises a hard, fast curing matrix material.

According to a preferred example of the invention, the resin of inner layer 3i comprises Cablelite 3287-9-39A and the resin of outer layer 3o comprises Cablelite 3287-9-75, both manufactured by DSM Desotech, Inc. Still more preferably, the resin of inner layer 3i essentially consists of Cablelite 3287-9-39A and the resin of outer layer 3o essentially consists of Cablelite 3287-9-75.

According to the present invention, a sheath 4 is applied radially outer to the resin layer 3.

Preferably, the radial thickness of sheath 4 is between about 100 μm and 250 μm, more preferably between 100 μm and 200 μm. In a preferred example, the radial thickness of sheath 4 is about 150 μm. This thin sheath results in a highly compact unit, wherein the outer diameter (in case of an acrylate resin with an outer diameter of 1.3) is about 1.6 mm.

In addition to compactness, the unit according to the present invention also provides easy access to the optical conductors, as it will become clear in the following.

Sheath 4 is substantially consisting of a thermoplastic polymer. Preferably, the thermoplastic polymer is a high density polyethylene (HDPE) having a density of about 0.950 g/cm³ (ASTM D792) and hardness equal to or higher than 59 Shore D (ASTM D2240).

In one example, sheath 4 is substantially consisting of a black, bimodal co-polymer high density polyethylene (HDPE) characterized by at least one of low shrink-back, excellent stress-crack resistance, good melt strength and wide processing window. One thermoplastic polymer adapted for the sheath 4 is Borealis Borstar® HE6062. One alternative is Borealis Borstar® grade HE6067.

Preferably, sheath 4 is extruded over the resin layer 3. According to the present invention, the sheath 4 is over and in close contact with the outer layer 3o of resin material.

For the purposes of the present description and claims, the term "in close contact" is meant to indicate that there is a contact between most of the outer surface of the outer layer 3o of resin material and the inner surface of the sheath 4. Such a contact extends for at least 90%. The term "in close contact" excludes the presence of a gap between the two surfaces. As the two layers 3 and 4 are in close contact and no gap is provided therebetween, the sheath 4 can not slide on the resin layer 3.

The inventors have found that the close contact between the sheath 4 and the high modulus outer layer 3o, allows the use of a thin sheath 4, while obtaining a unit with sufficient stiffness across a temperature range down to −10° C. for reaching a good installation performance.

Figure 4:
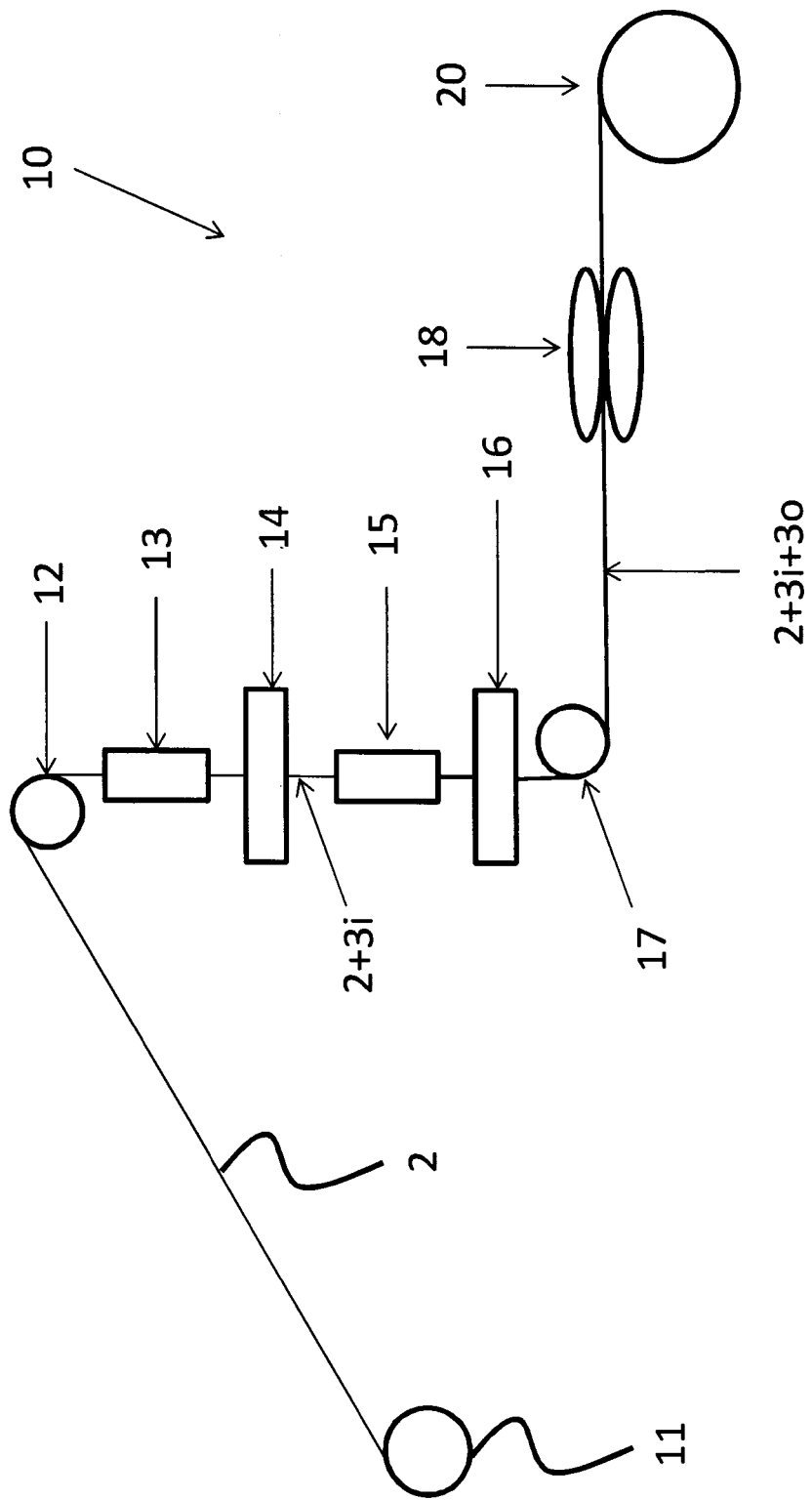
FIGS. 4, 5 and 6 diagrammatically show an example of manufacturing apparatus for manufacturing a cable according to the invention.

FIG. 4 diagrammatically shows an apparatus 10 for providing a number of optical conductors 2 embedded in a dual layer resin material 3.

A number of optical conductors (typically, optical fibers) 2 are unwound from a corresponding number of bobbins 11 or the like. According to an example of the invention, there is provided a first resin applicator 13 for applying a first inner layer 3i of resin (which could comprise Cablelite 3287-9-39A or the like). After the first resin applicator 13 a first curing source 14 is provided. Such first curing source 14 could comprise a UV lamp or the like for curing the inner layer of resin 3i.

As shown in FIG. 4, a second applicator 15 for applying a second outer layer 3o of resin (which could comprise Cablelite 3287-9-75 or the like) is provided. After the second resin applicator 15 a second curing source 16 is provided. Such second curing source 16 could comprise a UV lamp or the like for curing the layer of resin 3o.

The apparatus could also comprise a capstan 18 before a take-up station 20.

Figure 5:
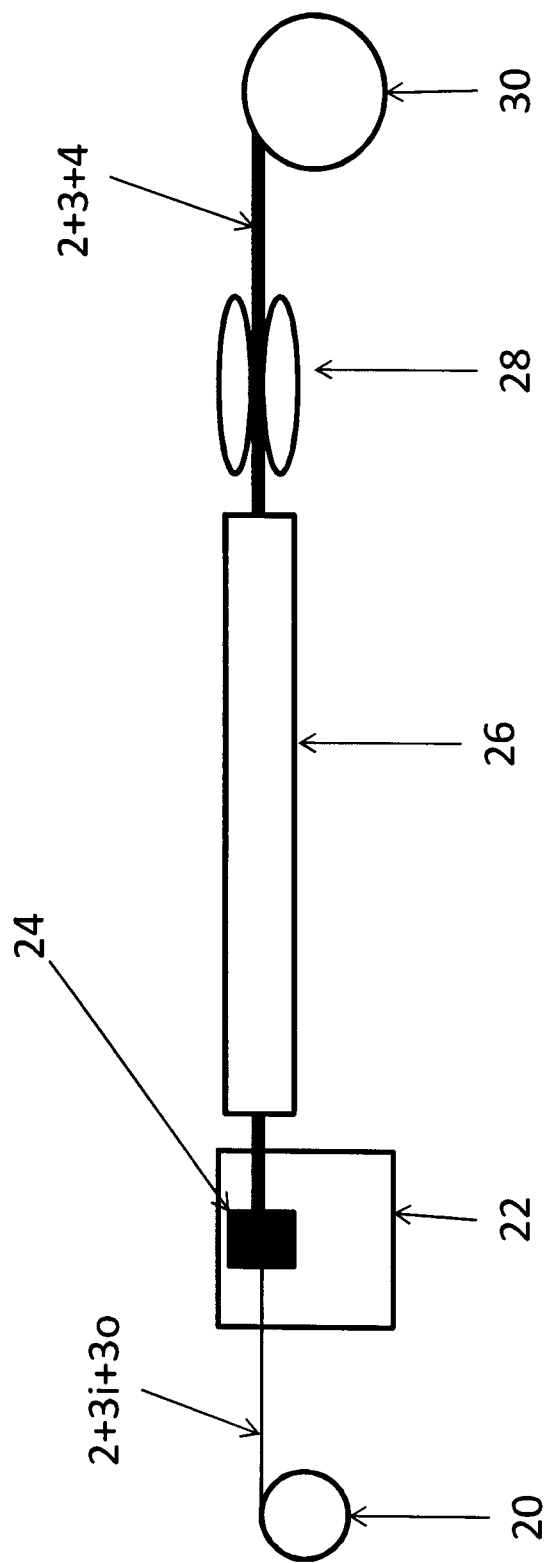

With reference to FIG. 5, the optical conductors 2 covered with first and second resin layers 3i, 3o are then passed through an extruder 22 with an extruder cross-head 24. The optical unit is then passed through a cooling trough 26. Finally, a capstan 28 and a take-up arrangement 30 can be provided.

Figure 6:
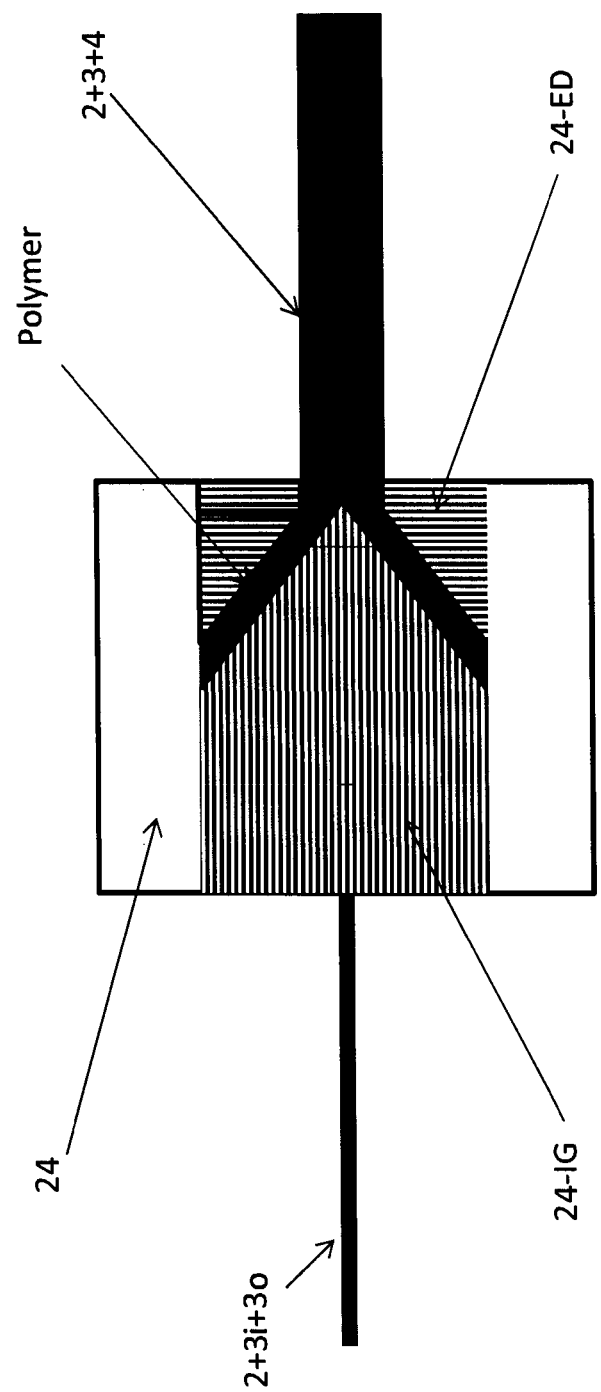

FIG. 6 diagrammatically shows a fill solid set-up of the extruder cross-head 24. The "close contact feature" mentioned above can be obtained by using the fill solid set-up in the extruder cross-head of FIG. 6.

By this process, the end of cable guide is inside the extrusion die 24-ED. This die will be approximately the same size as the final cable diameter. This means that the polymer is formed around the cable core (optical conductors and layer 3 of a thermoplastic or thermosetting plastic substance) at extremely high pressure. This results in a cable sheath 4 that is formed tightly onto the cable core 3.

The Applicant has tested an optical unit according to the present invention for evaluating the installation performance. Two comparative known blown optical fibre units have been also tested in the same conditions. Table 1 below shows the main characteristics of the three tested optical units. The installation root for carrying out the test is defined in IEC 60794-1-2. The test has been carried out by using a blowing head MicroJet™ EM-25 manufactured by Plumettaz SA, Bex, Switzerland at a pressure of 10 bar at an ambient temperature of between 15-20° C. The test was carried out as disclosed in the paper "do the ambient weather conditions affect the installation performance of microduct fibre units?" by Ralph Sutehall and Martin Davies, 61$^{th}$ IWCS Conference, November 2012.

Table 1 shows the main characteristics of the optical units subjected to test.

TABLE 1

|  | Optical Unit # 1 (invention) | Optical Unit # 2 (comparative) | Optical Unit # 3 (comparative) |
| --- | --- | --- | --- |
| N. of optical fibers | 12 | 12 | 12 |
| Type of optical fibers | Single/multi mode nominal diameter 250 μm | Single/multi mode nominal diameter 250 μm | Single/multi mode nominal diameter 250 μm |
| Layer around the optical fibers | Cabelite 3287-9-39A | Cabelite 3287-9-39A | Empty space |
| Diameter of layer around optical fibers [mm] | 1.3 | 1.15 | 1.3 |
| Outer layer | Borstar ® HE6062 | Cabelite 3287-9-75 | Vicaflex (a tailor made Styrene-Butadiene-Styrene (SBS) based thermoplastic compound) |
| Particle material embedded in outer layer | none | Glass beads (average diameter 80 μm, average density 500/cm$^2$) | none |
| Thickness of outer layer [mm] | 0.15 | 0.1 | 0.1 |
| Outer diameter [mm] | 1.6 | 1.4 | 1.5 |

Table 2 shows the results of tests in qualitative terms.

TABLE 2

|  | Optical Unit # 1 (invention) | Optical Unit # 2 (comparative) | Optical Unit # 3 (comparative) |
| --- | --- | --- | --- |
| Installation performance | Excellent | Good | Average |
| Easy of accessing fibers | Good | Excellent | Average |
| Mechanical performance | Excellent | Average | Good |
| Temperature performance after installation | Good | Excellent | Average |

Figure 2:
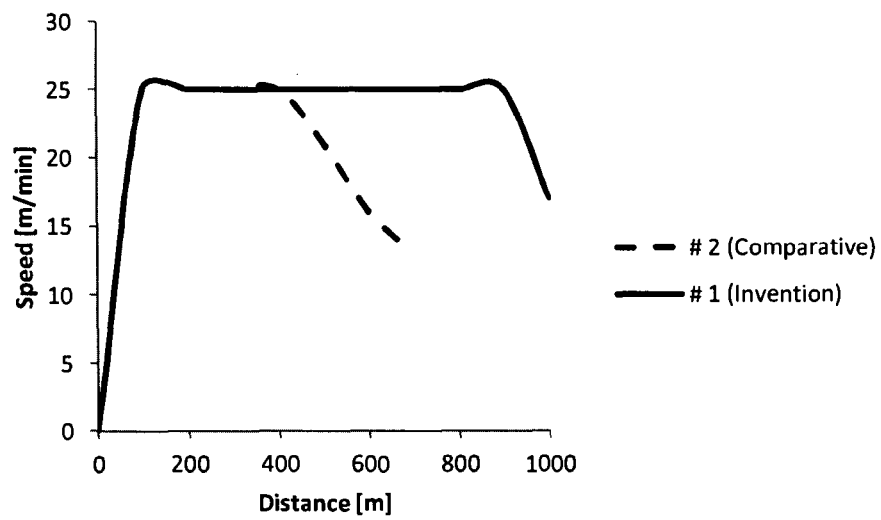
FIG. 2 is a graph of distance [m] Vs. speed [m/min] for an optical unit according to the invention and a comparative optical unit.

FIG. 2 is a graph of distance [m] Vs. speed [m/min] showing the installation performance in quantitative terms. As it can be inferred, the optical unit #2 (comparative) can be installed up to 650 m. However, over 400 m the speed rapidly decreases from about 25 m/min to about 13 m/min. Such installation performance is presently considered good.

The optical unit #1 according to the invention shows excellent installation performance as it can also be blown up to a distance of about 1000 m. The blowing speed remains substantially stable at about 25 m/min up to a distance higher than 800 m. In the last length, the speed decreases up to about 15 m/min.

Figure 3:
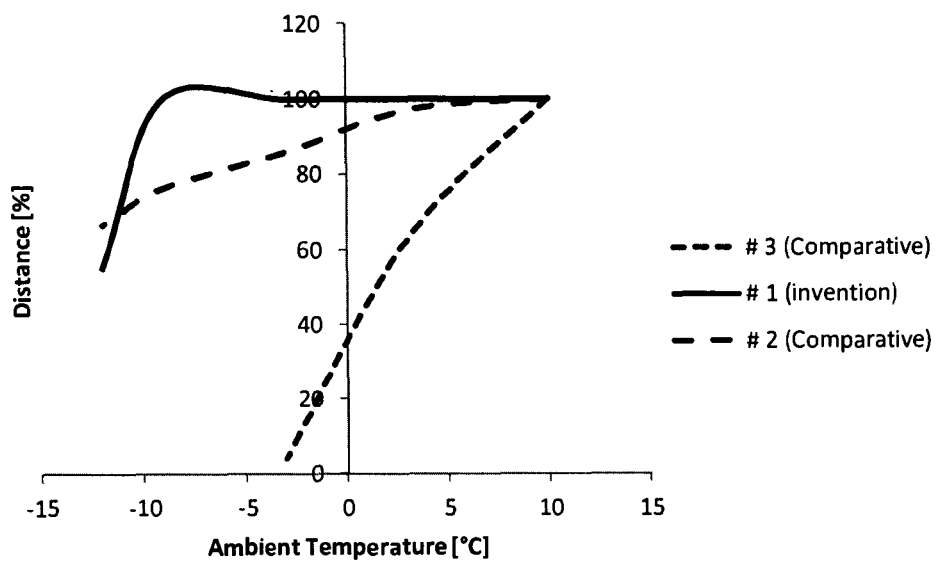
FIG. 3 is a graph of temperature [° C.] Vs. distance [%] for an optical unit according to the invention and a comparative optical unit.

FIG. 3 is a graph of temperature [° C.] Vs. distance [%]. A value of 100% corresponds to an installation reference distance of 500 m. From the graph it becomes clear that in the temperature range from about −10° C. to +10° C. at least a distance of about 500 m can be reached. The optical unit #2 (comparative) exhibits lower performance at low temperatures, below 0° C. The graph also includes a curve for a known polymeric optical unit having a comparable size (diameter) and number of optical fibers (#3 comparative optical unit). It becomes clear that the installation performance are comparable to the installation performance of the optical unit #1 according to the present invention only at about +10° C. Below such a temperature, the installation performance of the known polymeric optical unit degrades in a unacceptable way. The known polymeric optical unit #3 is substantially a cable of 1.5 mm outer diameter which comprises fibres within a tube of 1.3 mm which then has a sheath applied around the tube.

As said above, the optical unit according to the present invention provides good performance in terms of accessibility of optical conductors typically optical fibers). Access to the optical fibers can take place with a fiber stripper, for instance a fiber stripper type "Stripper fibre 1A" manufactured by Ideal Industries Inc. Herebelow the main steps according to one possible way to access the fibers will be disclosed for a 12 fiber unit. The fibers could be accessed also in other ways.

On a scrap section of optical unit the depth for cutting through the sheath without damaging the resin coating is set.

From a point about 30 mm from the end of the unit, the fibre stripper is slid along the unit to the end of the unit to remove about 30 mm of the sheath.

From the point where the sheath has been removed the sheath is gently separated for a desired length from the resin coated unit.

Using the fibre stripper or a sharp knife a length (of about 30 mm, for instance) of unit coating is removed from the end of the unit. This could be done in one single step or in a plurality of steps. For instance, it could be done in three steps, i.e. about 10 mm at a time.

Whilst holding half of the optical fibres in each hand, the fiber groups are gently pulled apart.

Taking one of the groups of optical fibres, it is split down into two groups

The step of sliding the fiber stripper is repeated with the other group of optical fibres.

The groups of optical fibres are continuously split until there are 12 individual fibres.

The unit coating will remain on a few of the individual optical fibres. The coating can be gently removed from the fibre using a fingernail, starting at the end of the optical fibre. This should be undertaken in 25 mm sections. This operation is repeated on any other optical fibres to which the coating has adhered to.

If necessary, a tissue wipe can be used for removing any excess resin from the optical fibres.

The invention claimed is:

1. An optical fiber unit for air-blown installations comprising a number of optical conductors, a first layer of resin material, a second layer of resin material radially outer to the first layer of resin material and an outermost sheath of a thermoplastic material, wherein:
   each of said optical conductors comprises an optical glass core surrounded by a glass cladding and a coating system comprising one or two layers of cured resins;
   said second layer of resin material has a secant modulus higher than a secant modulus of said first layer of resin material;
   said outermost sheath of said thermoplastic material comprises a high density thermoplastic polymer; and said outermost sheath of said thermoplastic material is over and in close contact with said second layer of resin material, wherein:

there is no gap between said outermost sheath of said thermoplastic material and said second layer of resin material; and said outermost sheath of said thermoplastic material cannot slide on said second layer of resin material.

2. The optical fiber unit of claim 1, wherein a radial thickness of the outermost sheath is between 100 μm and 250 μm.

3. The optical fiber unit of claim 2, wherein the radial thickness of the outermost sheath is between 100 μm and 200 μm.

4. The optical fiber unit of claim 1, wherein the secant modulus of the first layer is between 0.5 MPa and 25 MPa.

5. The optical fiber unit of claim 4, wherein the secant modulus of the first layer is between 0.6 MPa and 10 MPa.

6. The optical fiber unit of claim 1, wherein the secant modulus of the second layer is between 500 MPa and 1000 MPa.

7. The optical fiber unit of claim 6, wherein the secant modulus of the second layer is between 600 MPa and 750 MPa.

8. The optical fiber unit according to claim 1, wherein the inner layer essentially consists of a matrix material with an elongation at break higher than 130%.

9. The optical fiber unit according to claim 1, wherein said outermost sheath substantially consists of a high density polyethylene.

10. The optical fiber unit according to claim 9, wherein said high density polyethylene has a hardness equal to or higher than 59 Shore D.

11. A method of manufacturing an optical fiber unit for air-blown installations, comprising:

providing a number of optical conductors, wherein each of said optical conductors comprises an optical glass core surrounded by a glass cladding and a coating system comprising one or two layers of cured resins;

applying a first resin material on said number of optical conductors and curing said first resin material; and applying a second resin material on said cured first resin material and curing said second resin material; and forming an outermost sheath of a thermoplastic material around said second cured resin material, wherein said second layer of resin material has a secant modulus higher than a secant modulus of said first layer of resin material and wherein said outermost sheath of said thermoplastic material comprises a high density thermoplastic polymer and said outermost sheath of said thermoplastic material is formed over and in close contact with said second layer of resin material, wherein there is no gap between said outermost sheath of said thermoplastic material and said second layer of resin material, and wherein said outermost sheath of said thermoplastic material cannot slide on said second layer of resin material.

12. The method of claim 11, comprising forming an outermost sheath of a thermoplastic material with a radial thickness between 100 μm and 250 μm.

13. The method of claim 12, wherein said outermost sheath of said thermoplastic material has a radial thickness between 100 μm and 200 μm.

14. The method of claim 11, wherein forming an outermost sheath comprises a process wherein an end of an optical cable core, comprising the optical conductors, the inner layer and the outer layer, is arranged inside an extrusion die, wherein said extrusion die has a same size as an outer diameter of the optical fiber unit, and wherein polymer material is formed around the optical cable core at high pressure, so that said outermost sheath is formed tightly onto said optical cable core.

15. The method of claim 11, wherein the secant modulus of the second layer is between 600 MPa and 750 MPa.

16. An apparatus for manufacturing an optical fiber unit for air-blown installations, comprising:

a first resin applicator for applying a first resin material on a number of optical conductors and a first curing device for curing said first resin material, wherein each of said optical conductors comprises an optical glass core surrounded by a glass cladding and a coating system comprising one or two layers of cured resins;

a second resin applicator for applying a second resin material on said first resin material and a second curing device for curing said second resin material; and a head for forming an outermost sheath of a thermoplastic material around said second cured resin material, wherein said second layer of resin material has a secant modulus higher than a secant modulus of said first layer of resin material and wherein said outermost sheath of said thermoplastic material comprises a high density thermoplastic polymer and said outermost sheath of said thermoplastic material is formed over and in close contact with said second layer of resin material, wherein there is no gap between said outermost sheath of said thermoplastic material and said second layer of resin material, and wherein said outermost sheath of said thermoplastic material cannot slide on the second layer of resin material.

17. The apparatus of claim 16, wherein said head is configured so that an end of an optical core, comprising the optical conductors, the inner layer and the outer layer, is arranged inside an extrusion die, wherein said extrusion die has a same size as an outer diameter of the optical unit, and wherein polymer material is formed around the cable core at high pressure, so that the outermost sheath is formed tightly onto said cable core.

18. The apparatus of claim 16, wherein a radial thickness of the outermost sheath is between 100 μm and 250 μm.

19. The apparatus of claim 18, wherein the radial thickness of the outermost sheath is between 100 μm and 200 μm.

20. The apparatus of claim 16, wherein the secant modulus of the second layer is between 600 MPa and 750 MPa.

* * * * *